United States Patent [19]
White et al.

[11] Patent Number: 5,501,501
[45] Date of Patent: Mar. 26, 1996

[54] TRUCK-BED DETACHABLE SEAT ASSEMBLY

[76] Inventors: Robert M. White, P.O. Box 337, Arroyo Grande, Calif. 93421; Jeffrey P. Zee, 3965 Sourdough Rd., Acton, Calif. 93510

[21] Appl. No.: 222,014

[22] Filed: Apr. 4, 1994

[51] Int. Cl.⁶ ..................................................... B60N 2/24
[52] U.S. Cl. ....................................... 296/64; 297/378.12
[58] Field of Search ............................ 296/63, 64, 65.1, 296/66, 67, 69; 297/378.1, 378.12, 378.13, 381, 468

[56] References Cited

U.S. PATENT DOCUMENTS

| | | | |
|---|---|---|---|
| 3,711,153 | 1/1973 | Cunningham | 297/378.1 |
| 3,829,151 | 8/1974 | Fellenstein | 296/64 |
| 3,840,263 | 10/1974 | Bowden | 296/64 |
| 5,029,928 | 7/1991 | Huber | 296/63 |
| 5,139,301 | 8/1992 | Lewis | 296/63 |
| 5,167,203 | 12/1992 | Scott et al. | 297/468 |
| 5,318,350 | 6/1994 | Okamoto | 297/468 |
| 5,368,354 | 11/1994 | Martin | 296/64 |

*Primary Examiner*—Dean Kramer
*Attorney, Agent, or Firm*—Albert O. Cota

[57] ABSTRACT

A seat assembly (10) that is particularly designed to be installed on the truck bed (60) of a pick-up type truck. The assembly (10) includes a first and second side plate (16) that allows the attachment of a seat (20) and an articulated backrest (24). The backrest is designed to be locked in either an upright, sitting position or to be lowered against the upper surface of the seat (20) when the assembly (10) is not in use. To install the seat assembly (10) to the truck bed (60), a set of four, flush-mounted seat coupling plates (14) are attached to the truck bed. A corresponding set of L-brackets (18) are attached to the first and second side surfaces (20C, 20D) of the seat (20). The brackets (18) have a nut bore (18C) through which is inserted a threaded bolt (18E). The bolt attaches to the coupling plate (14) to securely attach the seat assembly (10) to the truck bed (60). The seat assembly (10) also includes a seat belt assembly (30) that restraints a sitter, an animal safety harness (32) that attaches to the seat belt assembly (30) and an optional backrest cushion (34), a seat cushion (36), a headrest assembly (38), and an articulated armrest assembly (40).

20 Claims, 5 Drawing Sheets

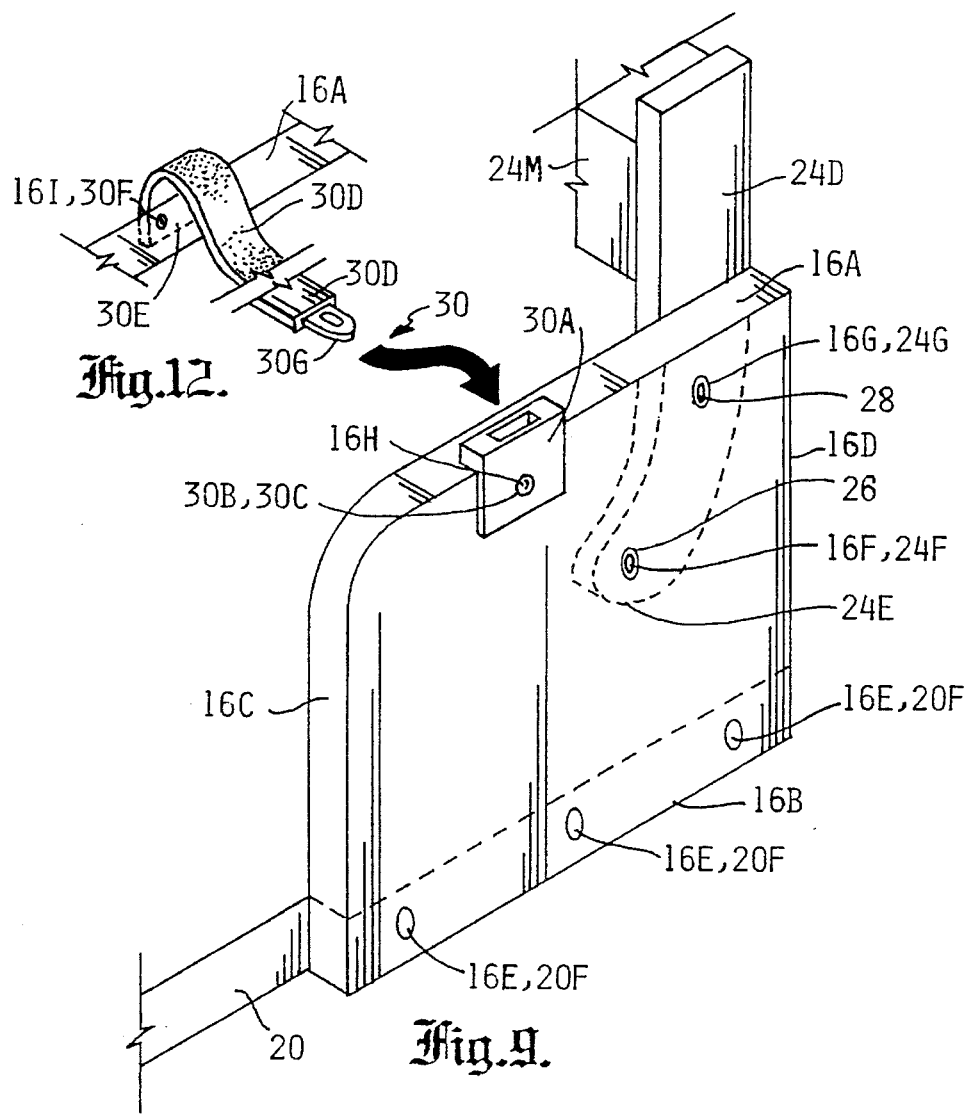
Fig.12.
Fig.9.
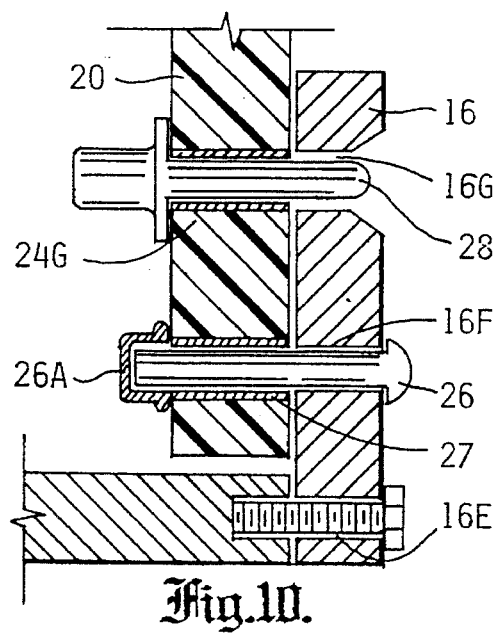
Fig.10.

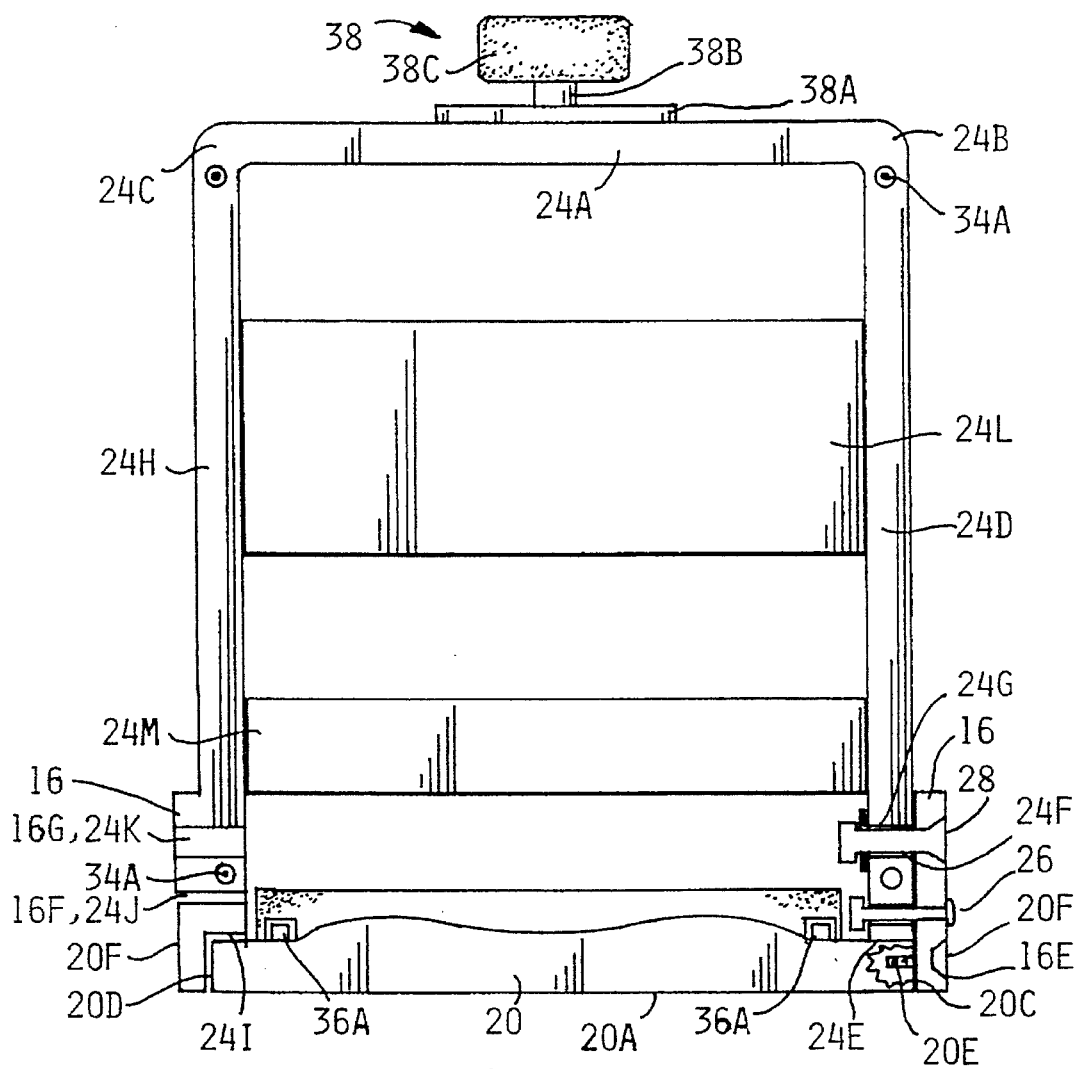
Fig. 11.
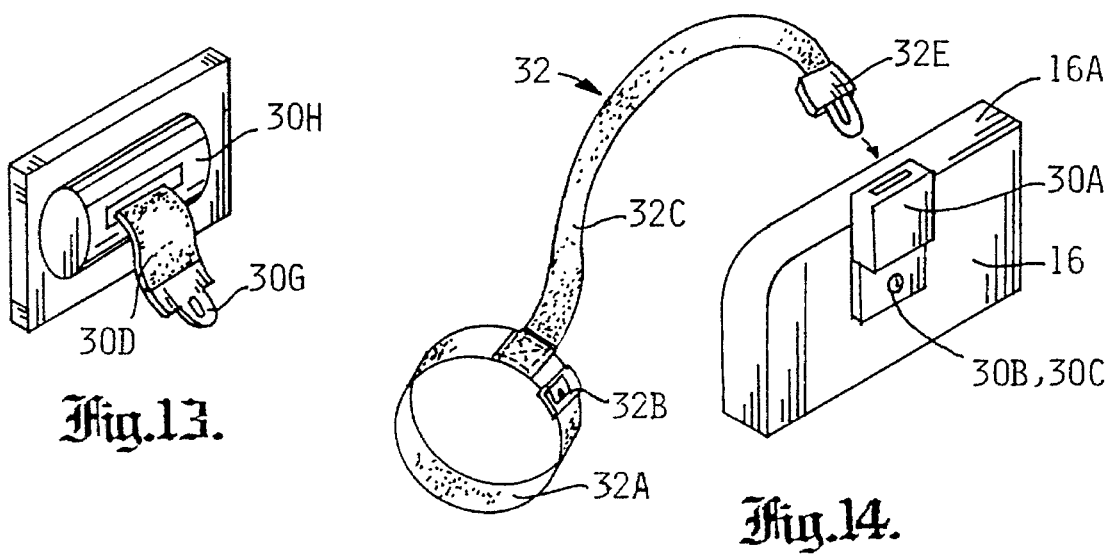
Fig. 13.
Fig. 14.

TRUCK-BED DETACHABLE SEAT ASSEMBLY

TECHNICAL FIELD

The invention pertains to the general field of detachable vehicle seats and more particularly to a foldable seat assembly that includes a seat belt assembly and that is designed to be easily attached and detached to the bed of a pick-up truck.

BACKGROUND ART

Pick-up trucks are most often used as utility vehicles, however, they are also used as recreational vehicles. Most of these pick-up trucks are designed to carry only two or three passengers. Therefore, if more persons are to be carried, they must be carried within the pick-up truck bed. The danger to passengers riding in a truck bed is well known. Even when sitting on the floor, a passenger can be easily thrown from the truck bed when the truck is turning or comes to a fast stop.

Current motor vehicle safety standards and regulations in many states, require that vehicle seats attached to truck beds include seat belt systems and be adequately secured to the truck structure. The requirement to have the seats secured is a prudent safeguard because when there is a vehicle impact, extreme loads are transferred from the seat belts to the seat structure. Further, the seat may be further subjected to stressful loads due to occupants or objects striking the seat. Additionally, some states have enacted laws that require animals riding in the truck bed to be harnessed and tethered. The instant invention also provides for this animal safety requirement.

Most current models of pick-up trucks generally do not include provisions to have a seat attached to the floor of a truck bed. However, the prior art does disclose patents that allow such a seat to be attached as described below. For the most part, the prior art designs are relatively complex and do not provide the structural integrity or ease of removal that is inherent in the instant invention. Additionally, none of the prior art patents disclose a seat assembly that includes a seat belt assembly to which an animal safety harness and tether can be attached.

The search of literature and prior art patents did not disclose any truck bed seats that read directly on the combination claims of the instant invention. However, the following U.S. patents were considered related:

| U.S. PAT. NO. | INVENTOR | ISSUED |
| --- | --- | --- |
| 5,139,301 | Lewis | 18 August 1992 |
| 5,029,928 | Huber | 9 July 1991 |
| 4,971,379 | Rampel, et al | 20 November 1990 |

The 5,139,301 Lewis patent discloses a portable truck bed seat that is designed to be attached to the bed of a pickup truck. The seat includes short legs and body-supporting cushions attached to a frame structure. The frame structure has adjustable clamps that are movably attached to the edges or lips of the truck beds. These clamps function to effectively lock the seats in position during use.

The 5,029,928 Huber patent discloses a folding, solid polyfoam cushioned or inflatable seat designed to be installed on a pickup truck bed. The seat includes a removable seat belt assembly that may be installed as a separate element or as an integral part of the installed seat. The seat also includes a hinge arrangement that permits the seat to move from an upright position to an inclined position, and also allows installation in a variety of truck bed sizes. The seat has an attaching support which connects to the truck for easy removal and reinstallation.

The 4,971,379 Rampel, et al patent discloses a vehicle seat latch with a take-up mechanism for use in securing a removable bench seat to a vehicle. The bench seat is supported on laterally spaced pedestals which are engageable with support shafts in the floor structure of a vehicle. The rearward end of the pedestals include an elongated U-shaped slot for engagement with the support shaft. The slots are elongated to accommodate variations in the vertical height of the support shafts in the vehicle floor. The latch take-up mechanism includes a take-up hook which is rotatable underneath the support shaft. The hook engages the lower surface of the support shaft to prevent the bench seat from rocking forward during rapid deceleration of the vehicle.

For background purposes and as indicative of the art to which the invention relates, reference may be made to the following remaining patents found in the search:

| PATENT NO. | INVENTOR | ISSUED |
| --- | --- | --- |
| 4,315,653 | Sparling | 16 February 1982 |
| 4,118,062 | Harder, Jr., et al | 3 October 1978 |

DISCLOSURE OF THE INVENTION

The invention is designed to add further utility to a truck and especially a pick-up type truck, by attaching a detachable seat assembly to the truck bed. The attached seat assembly, when used in combination with an included seat belt assembly, also allows compliance with a law, in effect in many states, that prohibits a person riding in the truck bed to do so without a body restraint.

To utilize the seat assembly, it is first necessary to bore into a truck bed, at least two or preferably four coupling plate bores. Into these coupling plate bores are inserted and attached a set of flush-mounted coupling plates. In its most basic design, the structure of the seat assembly consists of:

1. a first and second side plate, with each plate having an upper edge, a lower edge, a front edge and a back edge.

2. a seat that is rigidly attached by an attachment means, adjacent to the inside lower edge of each of the side plates. To the side surfaces of the seat are attached a set of L-brackets that have a nut bore on their horizontal sections. Through each nut bore is inserted a threaded bolt that attaches to a seat coupling plate to securely retain the seat assembly to the truck bed.

3. an articulated backrest that is swivelly attached, by an attachment means, adjacent to the inside back edge of the first and second side plates. When so attached, the back seat can be locked by a locking means in an upright sitting position and when the locking means is released, the backrest can be folded over the seat to place the assembly in the stowed configuration. The backrest attachment means may consist of either a straight pin, a spring-loaded pivot pin or a combination latch and stop.

4. a seat belt assembly attached between the upper edges of the first and second side plates. This assembly allows a person sitting on the seat to be securely fastened-in to thus comply with a law that requires a person riding in the truck bed to be securely restrained. In some states, animals, such as dogs, must also be collared and tethered. The inventive seat assembly includes an animal safety harness that allows compliance to this law.

The seat assembly can be further enhanced by including a backrest cushion that easily attaches and detaches to the backrest; a seat cushion that also is detachably attached to the seat, a headrest assembly that is adjustably attached to the upper frame member of the backrest, and an articulated armrest assembly. The arm rest assembly is placed in an upright, usable position when the seat is in use and automatically collapses against the seat when the backrest of seat assembly is placed in its folded, stowed position.

In view of the above disclosure, it is the primary object of the invention to provide a seat assembly that easily attaches to a truck bed and that includes a seat belt assembly that restraints a person sitting on the seat.

In addition to the primary object of the invention, it is also an object to produce a seat assembly that:

- includes at least one keylock that secures the seat to the seat coupling plates,
- includes a spring-loaded belt-retracting assembly that allows the seat belt to be retracted into a housing when the belt is not in use,
- can be used as a beach or picnic chair when removed from the truck bed,
- when the backrest is folded down, there is virtually no wind resistance added to the truck,
- has the seat mounting plates flushly mounted so as not to deter from the intended utility of the truck bed,
- is virtually maintenance free, and
- is cost effective from both a manufacturer and consumer points of view.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 9 is a perspective view of a side plate showing the attachment of the seat, backrest and the seat-belt buckle receptor of the seat belt assembly.

FIG. 10 is a front sectional view showing the attachment of the first side plate to the seat and backrest.

FIG. 11 is a front elevational view showing the design of the backrest, a first and second side plate attached to the seat and backrest and a headrest attached to the upper frame member of the backrest.

FIG. 12 is a perspective view of the attachment section of the seat-belt attached to the second side plate.

FIG. 13 is a perspective view of a spring-loaded belt retracting assembly.

FIG. 14 is a perspective view of a first embodiment of an animal safety harness.

BEST MODE FOR CARRYING OUT THE INVENTION

Figure 1:
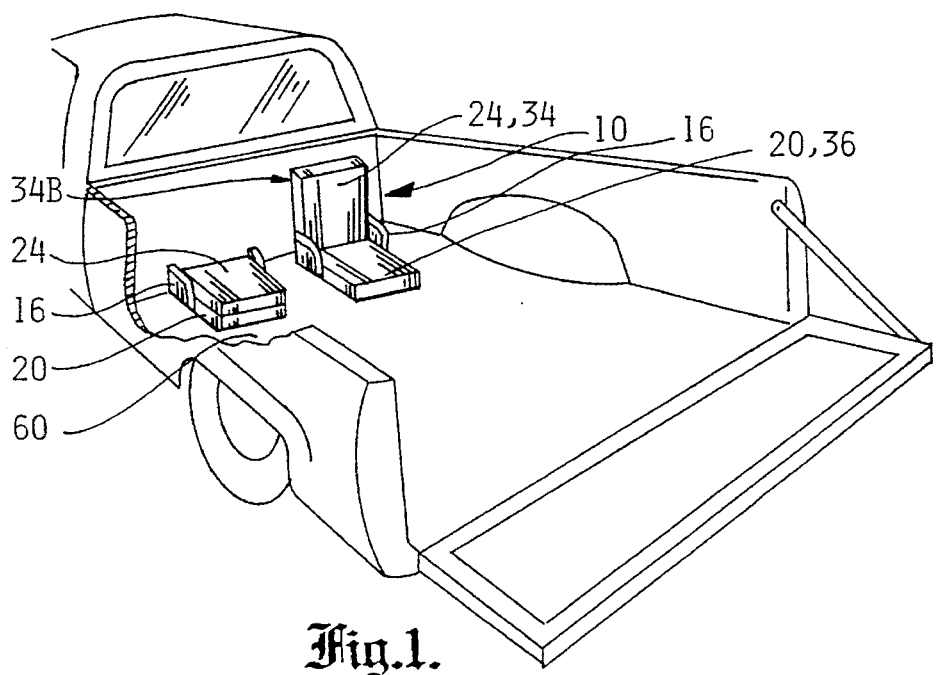
FIG. 1 is a perspective view of a pickup-type truck having a pair of seat assemblies attached to its truck bed. One of the assemblies is shown with the backrest in its upright usable position and the other with the backrest in its folded stowed position.

The best mode for carrying out the seat assembly 10 is shown in FIGS. 1–17 and consists of the following major elements: a seat-coupling plate bore 12 that is bored into a truck bed 60, a seat coupling plate 14, a first and second side plate 16, an L-bracket 18, a seat coupling plate 19, a seat 20, a seat attachment rod 21, a backrest 24, an attachment-rod retention structure 25, a seat-belt assembly 30 and, an animal safety harness 32.

The seat assembly 10 is designed to be easily attached and detached to the bed of a truck and more particularly to the bed of a pick-up type truck as shown in FIG. 1. When the seat assembly is not being used in the truck, the backrest 24 can be released and folded over the seat 20 as also shown in FIG. 1. Alternatively, the seat assembly 10 may be removed from the truck bed and used as a beach or picnic chair.

Figure 4:
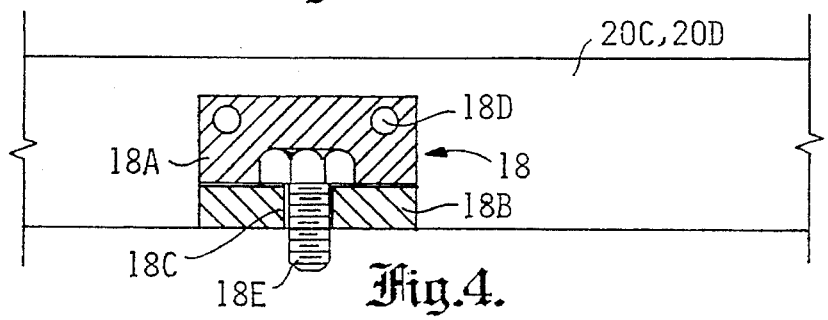
FIG. 4 is an elevational front view of the L-bracket used in combination with the seat coupling plate shown in FIGS. 2 and 3.

To utilize the seat assembly 10, it is necessary that a means be provided for securely attaching the seat 20 to the truck bed 60. Two seat attachment means are disclosed. In each, it is first necessary that a set of coupling plate bores 12 be bored into the truck bed 60. At least two coupling plate bores 12 are necessary for safety and stability. However, for increased safety and stability, four such bores 12 are preferred. The bores 12 are sized to accept at least two and preferably four seat coupling plates 14 or 19. These plates are designed to be substantially flush mounted to the truck bed 60 so as not to significantly affect the flat surface of the truck bed and to be attached therein by an attachment means. The preferred seat attachment means utilizes a coupling plate 14 that is used in combination with an L-bracket 18 as shown in FIGS. 2, 3 and 4.

Figure 2:
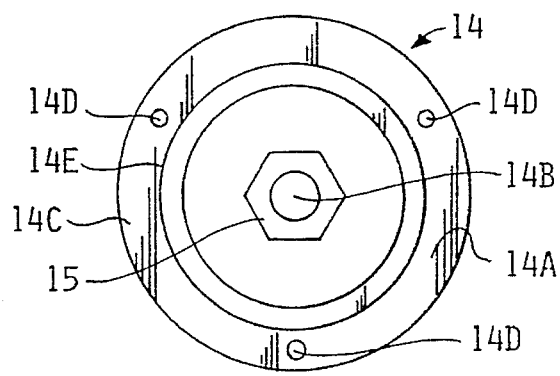
FIG. 2 is a bottom plan view of the seat coupling plate used with the preferred embodiment of the seat attachment means.
Figure 3:
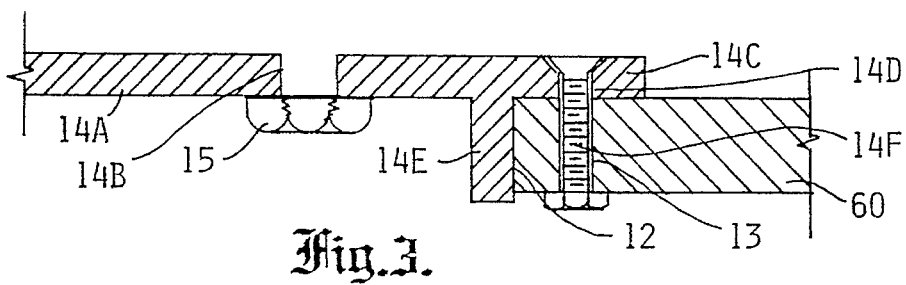
FIG. 3 is a sectional, elevational side view of the seat coupling plate of FIG. 2 attached to a truck bed.

The seat coupling plate 14 as shown in FIG. 2, consists preferably of a circular structure that has an upper section 14A having a substantially centered bolt bore 14B therethrough and a mounting flange 140. Attached to the bottom surface of the upper section is a threaded nut 15 that is aligned over the bolt bore 14B as shown in FIG. 3. The mounting flange 140 has a set of equidistant mounting bores 14D as best shown in FIG. 2. Extending downward from the circumferential inner edge of the mounting flange 140 is an integral circular insert 14E. This insert is sized to fit into the coupling plate bore 12 on the truck bed 60 as shown in FIG. 3. When inserted, the mounting bores 14D on the flange 140 are aligned with the attachment bores 13 on the truck bed 60. Into these two interfacing bores is inserted a bolt and nut combination 14F that holds the coupling plate in place as also shown in FIG. 3.

This first design of the seat coupling plate 14 is used in combination with a set of at least two L-brackets 18 to provide the preferred means for attaching the seat 20 to the truck bed 60. Each of the L-brackets 18 as shown in FIG. 4, has a vertical section 18A and a horizontal section 18B. The horizontal section has a substantially centered nut bore 18C therethrough, and the vertical section 18A includes a plurality of bores 18D through which may be attached a screw or rivet to function as the means for attaching the L-brackets 18 to the first and second side surfaces 20C,20D of the seat 20. With the L-bracket 18 attached as shown in FIG. 4, the nut bore 18C on the horizontal section is placed in alignment with the nut bore 14B and threaded nut 15 on the seat coupling plate 14. When so aligned, a threaded bolt 18E is sequentially inserted through the nut bore 18C on the horizontal section 18B, the nut bore 14B on the plate 14 and finally is threaded into the threaded nut 15 to securely retain the seat assembly 10 to the truck bed 60 as shown in FIG. 1.

The second design of the seat attachment means utilizes a coupling plate 19 that is used in combination with a seat rod 21, a spring 23 and an attachment-rod retention structure 25 as shown in FIGS. 5, 6, 7 and 8.

Figure 5:
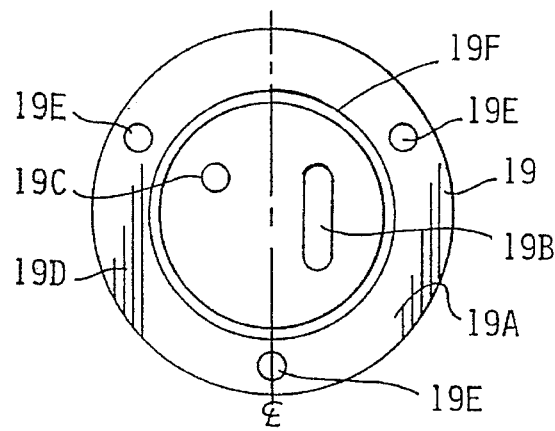
FIG. 5 is a bottom plan view of the seat coupling plate used with the second embodiment of the seat attachment means.
Figure 6:
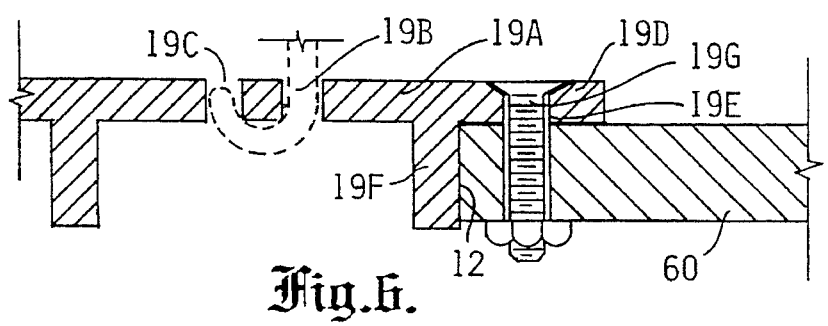
FIG. 6 is a sectional, elevational side view of the seat coupling plate of FIG. 5 attached to a truck bed.

The seat coupling plate 19 as shown in FIG. 5, consists preferably of a circular structure that has an upper section 19A having an elongated slot 19B therethrough that is offset from the centerline (CL) of the plate 19. Offset from the plate's centerline on the opposite side from that of the elongated slot 19B is a locking rod bore 19C therethrough. Extending outward from the upper section 19A is a mounting flange 19D having a set of equidistant mounting bores 19E therethrough as shown in FIG. 5. Extending downward from the circumferential inner edge of the mounting flange 19D is an integral circular insert 19F. This insert is sized to fit into the coupling plate bore 12 on the truck bed 60 as shown in FIG. 6, When inserted, the mounting bores 19E on the flange 19D are aligned with the attachment bores 13 on the truck bed 60. Into these two interfacing bores is inserted a bolt and nut combination 19G that holds the coupling plate in place as also shown in FIG. 6.

Figure 7:
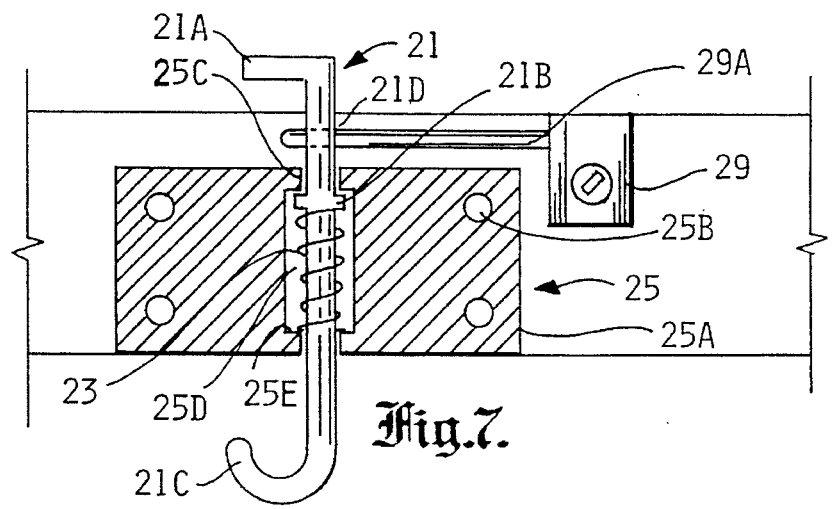
FIG. 7 is an elevational front view of a structure that houses a seat attachment rod that attaches to the seat coupling plate of FIGS. 5 and 6.

The slot 19B and bore 19C are sized to accept the seat attachment rod 21. The rod 21 as shown in FIG. 7, integrally includes an upper grasping handle 21A, a spring retention lip 21B that is located below the handle 21A, and a lower hook section 21C. A spring 23 as also shown in FIG. 7, is inserted into the rod 21. When inserted, the top surface of the spring 23 rests against the lower surface of the spring retention lip 21B.

Figure 8:
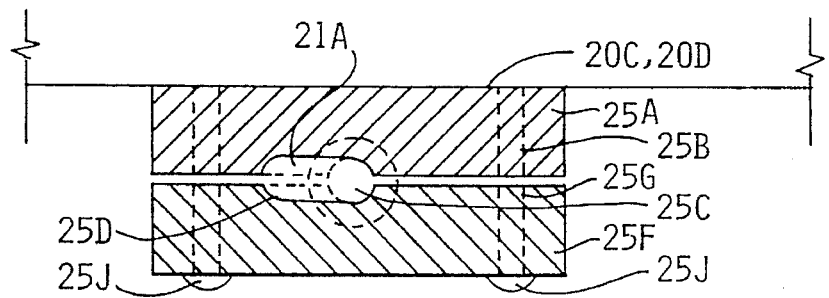
FIG. 8 is a top plan view of the structure shown in FIG. 7.

The rod is used in combination with at least two attachment-rod retention structures 25 as shown in FIGS. 7 and 8. Preferably two structures 25 are attached to the first side surface 20C and to the second side surface 20D of the seat to correspond with four seat coupling plates 19.

The inward section 25A includes a plurality of mounting bores 25B therethrough and further includes a vertically aligned rod channel 25C as shown best in FIG. 7. Within the rod channel 25C is a vertically aligned spring retention channel 25D that extends outward from the rod channel as also shown in FIG. 7. The rod 21 with the spring 23 attached is inserted respectively into the rod and spring retention channels. When so inserted, the bottom surface of the spring 23 rests on the bottom surface 25E of the spring channel with its top surface resting on the bottom surface of the spring retention lip 21B.

The outward section 25F as shown in FIG. 8, has a plurality of mounting bores 25G therethrough that are in alignment with the mounting bores 25B on the inward section 25A. The channel on the outward section also has a rod channel 25C and a spring retention channel 25D that are mirror images of the rod and spring retention channels on the inward section 25A. Thus, when the inward and outward channels interface, as shown in FIG. 8, and an attachment means 25J, preferably consisting of a screw, is inserted through the interfacing bores, the structure can be attached to the respective first and second side surfaces of the seat.

To operate this second design, the seat attachment rod 21 is grasped by the handle 21A. The handle is then rotated and placed in an aligned position that allows the lower hook section 21C to be inserted through the elongated slot 19B of the seat coupling plate 19. Once inserted, the rod is then again rotated until the end of the hook section 21C projects through the locking rod bore 19C. After the hook is inserted, the rod is released to allow it to be retained therein by the force of the spring 23. When all four rods are retained in their respective coupling plates 19, the seat assembly 10 is securely retained to the truck bed 60 as shown in FIG. 1. The seat attachment rod 21 may also be made to include near the upper grasping handle 21A a lock-rod bore 21D as also shown in FIG. 7. The seat attachment rod 21 with the bore 21D operates in combination with a keylock 29 that has attached a locking rod 29A as shown in FIG. 7. When the locking rod 29A is placed in the locking position, that is inserted into the lock-rod bore 21D, the seat attachment rod 21 is locked in placed.

Although the above attachment means are recommended, in some cases it may be possible to eliminate the coupling plates 14,19 and bore directly into the truck bed 60. For example, in the preferred attachment means, the truck bed 60 could be drilled directly with four bolt bores 14B spaced in a rectangular pattern. A threaded nut 15 would then be attached to the bottom surface of the truck bed 60 with its threaded section aligned over the bolt bores 14B. The L-bracket 18 would be attached as previously described. For the second design of the attachment means, the elongated slot 19B and locking rod bore would likewise be bored directly on the truck bed 60.

The seat 20 and backrest 24 are pivotally joined by means of identically dimensioned first and second side plates 16 as shown in FIGS. 9, 10 and 11. The side plate 16 as best shown in the perspective view of FIG. 9 has an upper edge 16A, a lower edge 16B, a front edge 16C and a back edge 16D. Normal to its side, as shown in FIGS. 9 and 10 are: at least two seat attachment bores 16E therethrough that are located near the lower edge 16B so that they are centered along the thickness of the seat 20; a backrest hinge pin bore 16F therethrough that is located nearer the back edge 16D; a backrest locking bore 16G therethrough located near the corner of the upper edge 16A and the back edge 16D; a seat belt receptor bore 16H therethrough that is substantially centered near the upper edge 16A of the first side plate 16; at least two seat belt attachment bores 16I therethrough that are located near the upper edge 16A of the second side plate in substantial alignment with the seat belt receptor bore 16H. The only difference between the two side plates is that the first plate includes the seat belt receptor bore 16H and the second plate includes the two seat belt attachment bores 16I.

The seat 20 of the seat assembly 10 as shown in FIGS. 1 and 11, has a lower surface 20A, an upper surface 20B, a first side surface 20C, and a second side surface 20D. The sitting or upper surface 20B, as shown in FIG. 11 is preferably contoured to provide additional sitting comfort. The first and second side surfaces 20C, 20D each have at least two side-plate attachment bores 20E therethrough. These bores are in alignment with the respective at least two seat attachment bores 16E on the first and second side plates 16. Through this bore set is inserted a threaded screw or bolt 20F that secures the first and second side plates 16 to the seat 20.

The backrest 24 of the assembly 10 is shown in FIGS. 1, 9 and 11. The backrest as best shown in FIG. 11, consists of an upper frame member 24A having a first end 24B and a second end 24C. Extending downward from the first end 24B is a first vertical member 24D and from the second end 24C is a second vertical member 24H. Near the bottom edges 24E, 24I of the vertical members and normal to the vertical members, is located respectively, a hinge pin bore 24F, 24J therethrough. Above the hinge pin bores, also normal to the vertical members is located respectively a locking bore 24G, 24K therethrough.

Through each of the hinge pin bores 24F, 24J and through the backrest hinge pin bores 16F in the side plates 16 is inserted and retained by a retaining means 26A, a pivot pin 26 as shown best in FIG. 10. The pins allow the backrest 24 to pivot and be placed in either an upright position or to be lowered against the upper surface 20B of the seat 20. Likewise, as also best shown in FIG. 10, a locking pin 28 is inserted through the locking bores 24G, 24K on the backrest 24 and through the backrest locking bores 16G on the first and second side plates 16. When the locking pins are inserted, the backrest 24 is secured in its upright, normal sitting position. Conversely, when the locking pins are not inserted, the backrest 24 may be pivoted downward, about the pivot pins 26, to allow the backrest to be lowered against the upper surface of the seat when the assembly 10 is not in use.

If desired, the locking pins 28 may be spring loaded. The spring loaded pins are located within a structure that is permanently attached to the first and second vertical members 24D, 24H of the backrest 24. Since these structures are well known in the art, they are not shown or described further.

In lieu of a locking pin 28, a latch and a stop (not shown) may be employed to allow the backrest to be displaced from its upright position to its lowered position.

To complete the backrest 24, as best shown in FIG. 11, an upper back support 24L and a lower back support 24M are attached between the first and second vertical members 24D, 24H. These back supports are curved outwardly to provide additional comfort to the sitter. Preferably, the entire backrest 24 including the back supports is molded of a high-impact plastic and includes metal sleeve inserts 27 that are inserted into the hinge pin bores 24F, 24J and locking bores 24G, 24K as shown in FIG. 10.

To aid in securing the safety of passengers sitting on the seat assembly 10, a seat belt assembly 30 is included. The assembly consists of a seat belt buckle receptor 30A as shown in FIG. 9 and a seat belt 30D attached to a buckle locking insert 30G as shown in FIG. 12. The receptor 30A has a bottom section that includes a bore 30B. Through this bore and through the seat belt receptor bore 16H, on the first side plate 16, is inserted and retained a receptor pin 30C. The pin allows the receptor 30A to be swivelly attached to the first side plate 16. The seat belt 30D attached to the buckle locking insert 30G has an attachment section 30E on its opposite end. This attachment section is attached to and near the upper edge 16A of the second side plate 16 by a pair of bolt and nut combinations 30F. When the buckle insert 30G is lockably inserted into the seat belt buckle receptor 30A, a person sitting on the assembly 10 is safely restrained therein.

To facilitate the use of the seat belt assembly 30, the seat belt 30D and the attachment section 30E may be housed within a spring-loaded belt-retracting assembly 30H as shown in FIG. 13. The assembly allows the belt to be retracted into the housing when the belt is not in use.

Figure 15:
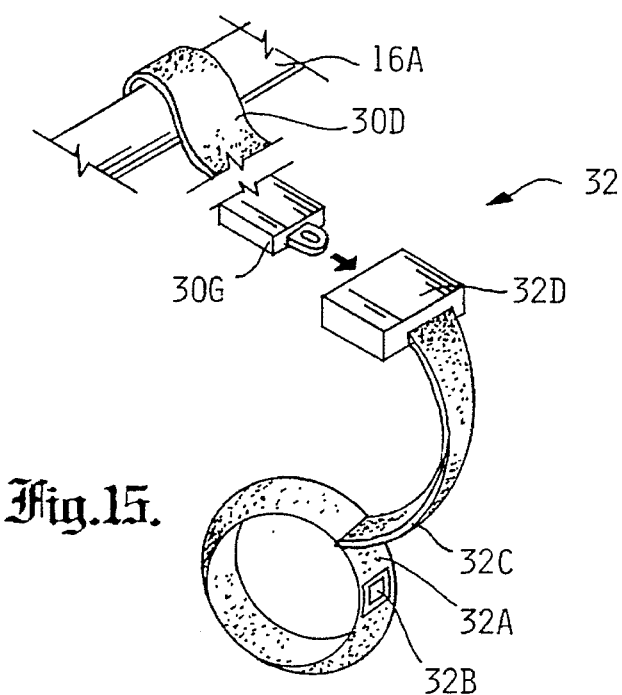
FIG. 15 is a perspective view of a second embodiment of an animal safety harness.

Recent laws have been passed in many states that require animals, such as dogs, to be tethered when riding in a pick-up truck. To comply with the law, the assembly 10 may include an animal safety harness 32 that is disclosed in two embodiments. The first embodiment as shown in FIG. 14, includes an adjustable harness 32A that is attached around the neck of an animal. In lieu of a neck harness as shown in FIGS. 14 and 15, a combination neck and body harness may be used. Attached to the harness 32A by an attachment means is one end of a belt 32C. The other end of the belt 32C is attached to a buckle insert 32E that is lockably inserted into the seat belt receptor 30A that is swivelly attached to the first side plate 16.

The second embodiment of the animal safety harness differs from the first embodiment in that the end of the belt 30, that is not attached to the harness, is attached to a buckle receptor 32D as shown in FIG. 15. In this design, the buckle receptor 32D is inserted into the buckle locking insert 30G that is attached to a seat belt 30D that attaches to the second side plate 16.

To enhance the utility and comfort of the invention, the seat assembly 10 may include a backrest cushion 34, a seat cushion 36, a headrest 38 and an articulated armrest assembly 40.

The backrest cushion 34 as shown in FIG. 1, is attached to the front surface of the backrest 24 by an attachment means. Preferably, this attachment means consists of a female detent 34A that is attached to each corner of the backrest as shown in FIG. 11. A corresponding male detent 34B as shown in FIG. 7, is attached to each back corner of the backrest cushion 34. When the two detents are pressed together, the back cushion is secured to the backrest 24.

The seat cushion 36 as also shown in FIG. 1 and in FIG. 11, is attached to the upper surface 20B of the seat 20 by an attachment means. The attachment means may also consist of a female and male detent combination, or as shown in FIG. 11, a set of hook and loop fasteners 36A that are respectively attached to the corners of the seat cushion 36 and the seat 20 may be employed.

The headrest assembly 38 is attached to the upper frame member 24A of the backrest 24 by an attachment means. One implementation of this attachment means, as shown in FIG. 11, consists of attaching a reinforced channel 38A to the upper edge of the backrest 24. Into this channel, is frictionally inserted a bar 38B to which is attached the headrest 38C. The headrest may also be attached to the bar 38B via a headrest positioning means to add further comfort.

Figure 16:
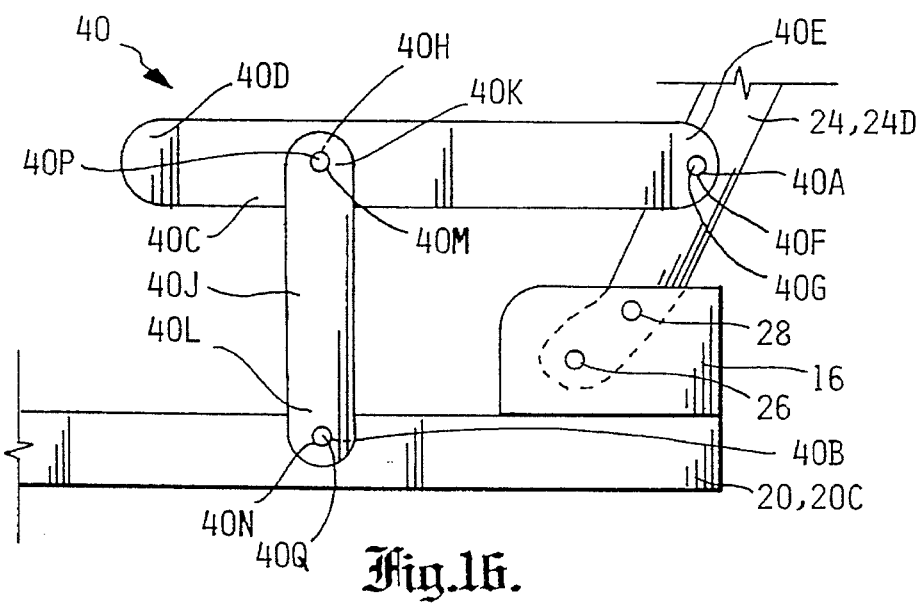
FIG. 16 is a side elevational view of the articulated armrest assembly shown in the extended, usable position.
Figure 17:
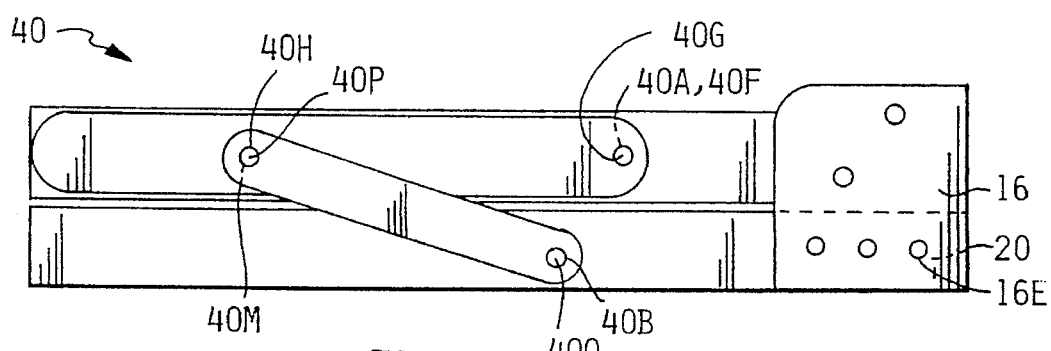
FIG. 17 is a side elevational view of the articulated armrest assembly shown in the collapsed position which automatically occurs when the backrest is lowered.

The articulated armrest assembly 40 is implemented by slightly modifying the backrest 24 and the seat 20. The backrest 24 is modified by boring a backrest swivel bore 40A that is located on its first and second vertical members 24D, 24H as shown in FIGS. 16 and 17. The seat 20 is modified by boring a seat swivel bore 40B substantially centered on its first and second side surfaces 20C, 20D as also shown in FIGS. 16 and 17.

The armrest 40 has a front section 40D and a back end 40E. Near the back end is located a backrest pin bore 40F that is aligned with the backrest swivel bore 40A. Into these two bores is inserted and attached a first swivel pin 40G that allows the armrest 40 to pivot about the first swivel pin. The armrest further has an armrest swivel bore 40H that is located near the front section of the armrest.

The armrest functions in combination with an armrest support 40J having an upper end 40K and a lower end 40L. The upper end 40K includes an armrest pin bore 40M and the lower end has a seat pin bore 40N. When a second swivel pin 40P is inserted and attached through the armrest pin bore 40M and the armrest swivel bore 40H, and a third swivel pin 40Q is inserted and attached through the seat pin bore 40N and seat swivel bore 40B, the armrest 40 remains in a usable horizontal position. Conversely, when the backrest is lowered, the armrest 40 automatically pivots and collapses against the seat 20.

While the invention has been described in complete detail and pictorially shown in the accompanying drawings it is not to be limited to such details, since many changes and modifications may be made to the invention without departing from the spirit and the scope thereof. For example, the seat assembly could be made as a bench-type seat that allows two or more persons to be seated. Also additional implements such as a folding leg structure having hook latches on the leg bottoms that attach to the coupling plates 14, a carrying handle, or an articulated armrest that when rotated 180-degrees from its arm rest position, functions as a pair of legs. Thus, it is described to cover any and all modifications and forms which may come within the language and scope of the claims.

We claim:

1. A seat assembly that detachably attaches to a truck bed, said seat assembly comprising:
   a) a first and second side plate, with each plate having an upper edge, a lower edge, a front edge and a back edge, said side plate further having normal to its side:
      (1) at least two seat attachment bores therethrough, located near the lower edge,
      (2) a backrest hinge pin bore therethrough, located near the back edge,
      (3) a backrest locking bore therethrough, located near the corner of the upper edge and the back edge,
      (4) at least two seat-belt attachment bores therethrough, located near the upper edge of said second side plate, and,
      (5) a seat-belt receptor bore therethrough, located near the upper edge of said first side plate and centrally aligned between said at least two seat belt attachment bores,
   b) a seat having a lower surface, an upper surface, a first side surface and a second side surface, with the first and second side surfaces each having at least two side-plate attachment bores therethrough in alignment with the respective at least two seat attachment bores on said first and second side plates, where through the attachment bores is inserted an attachment means that secures said first and second side plates to said seat,
   c) means for attaching said seat to the truck bed,
   d) a backrest comprising:
      (1) an upper frame member having a first end and a second end,
      (2) a first vertical member extending downward from the first end of the upper frame member and having near its bottom edge, normal to the first vertical member, a hinge pin bore therethrough and having above the hinge pin bore, also normal to the first vertical member, a locking bore therethrough,
      (3) a second vertical member extending downward from the second end of the upper frame member and having near its bottom edge, normal to the second vertical member, a hinge pin bore therethrough and having above the hinge pin bore, also normal to the second vertical member, a locking bore therethrough,
   e) a pivot pin inserted through each of the hinge pin bores on said backrest and through the backrest hinge pin bores on said side plates, where said pivot pins have means for being retained therein and allow, said backrest to be lowered against the upper surface of said seat,
   f) a locking pin inserted through each of the locking bores on said backrest and through the backrest locking bores on said first and second side plate, where when said locking pins are inserted, said backrest is secured in its upright, normal sitting position and when said locking pins are not inserted, said backrest pivots downward about said pivot pin to allow said backrest to be lowered against the upper surface of said seat when said assembly is not being occupied,
   g) a seat belt assembly comprising:
      (1) a seat belt buckle receptor that includes a bottom section having a bore therethrough that is in alignment with said seat-belt receptor bore on said first side plate, where through said bores is inserted and retained a receptor pin to swivelly attach said receptor to said first side plate, and
      2) a seat belt having an attachment section on one end and a buckle-insert on the other end, with the attachment section attached to and near the upper edge of said second side plate by a pair of bolt and nut combinations, where when said buckle insert is lockably inserted into said seat-belt receptor, a person sitting on said assembly is safely restrained thereto.

2. The assembly as specified in claim 1 wherein said means for attaching said seat to the truck bed comprises:
   a) a truck bed having at least two coupling plate bores therethrough and further having a set of equidistant attachment bores therethrough located near the perimeter of the coupling plate bores,
   b) at least two substantially flush-mounted seat coupling plates where each plate comprises:
      (1) an upper section having a substantially centered bolt bore therethrough and a mounting flange having a set of equidistant mounting bores therethrough,
      (2) an integral circular insert extending downward from the circumferential inner edge of the mounting flange, where the insert is sized to fit into said coupling plate bore on said truck bed where when inserted, the mounting bores on the flange are aligned with the attachment bores on the truck bed, where into the two interfacing bores is inserted a bolt and nut combination that holds said coupling plate in place,
      (3) a threaded nut attached to the bottom surface of the upper section with its threaded section aligned over the bolt bore,
   c) at least two L-brackets where each bracket has a vertical section and a horizontal section, with the horizontal section having a substantially centered nut bore therethrough and the vertical section of one bracket is attached, by an attachment means, to the first side surface of said seat and the vertical section of a second bracket is likewise attached to the second side of said seat, where when so attached, the nut bore on the horizontal section is aligned with the nut bore and threaded nut on said seat coupling plate, and d) a threaded bolt sequentially inserted through the nut bore on the horizontal section of said L-bracket, the nut bore on said coupling plate and into the threaded nut to securely retain said seat assembly to the truck bed.

3. The assembly as specified in claim 1 wherein said means for attaching said seat to the truck bed comprises:

a) a truck bed having at least two coupling plate bores therethrough and further having a set of equidistant attachment bores therethrough located near the perimeter of the coupling plate bores, b) at least two substantially flush-mounted seat coupling plates where each plate comprises:
  (1) an upper section having an elongated slot therethrough that is offset from the centerline of said plate, a locking rod bore therethrough that is offset from the centerline of said plate on the opposite side from that of the elongated slot, and a mounting flange having a set of equidistant mounting bores therethrough,
  (2) an integral circular insert extending downward from the circumferential inner edge of the mounting flange, where the insert is sized to fit into a coupling plate bore on said truck bed where when inserted, the mounting bores on the flange are aligned with the attachment bores on the truck bed, where into the plate and attachment bores is inserted a bolt and nut combination that holds said coupling plate in place, c) a seat attachment rod integrally having:
  (1) an upper grasping handle,
  (2) a spring retention lip located below the handle and
  (3) a lower hook section, d) a spring inserted into said rod with the top surface of said spring resting against the lower surface of the spring retention lip, e) at least two attachment-rod retention structures where each said structure comprises:
  (1) an inward section having a plurality of mounting bores therethrough and further having a vertically aligned rod channel that includes within the rod channel a vertically aligned spring retention channel that extends outward from the rod channel, where said rod with said spring is inserted respectively into the rod and spring retention channels with the bottom of said spring resting on the bottom surface of the spring retention channel,
  (2) an outward section having a plurality of mounting bores therethrough in alignment with the mounting bores on said inward section, and further having a channel rod and a spring retention channel that are mirror images of the rod and spring retention channels on said inward section, where when said inward and outward sections interface, and an attachment means is inserted through the interfacing bores, said structure can be attached to the respective first and second side surfaces of said seat, where when so attached, said rod can be rotated, by means of the handle, and placed in an aligned position that allows the hook section of said rod to be inserted through the elongated slot, then rotated again until the end of the hook section projects through the locking rod bore at which time, the rod is released to allow it to be retained therein by the force of said spring.

4. The assembly as specified in claim 3 further comprising:

a) a seat attachment rod having near the upper grasping handle a lock-rod bore, and b) a keylock attached, by an attachment means, to the side surface of said seat, where said lock has a locking rod that when placed in the locking position enters the lock-rod bore to lock said attachment rod in place.

5. The assembly as specified in claim 1 wherein said backrest further comprises an upper back support and a lower back support that are attached between said first and second vertical members.

6. The assembly as specified in claim 1 wherein the sitting surface of said seat is contoured to provide additional sitting comfort.

7. The assembly as specified in claim 1 wherein the belt and attachment section of said seat belt assembly are housed within a spring-loaded belt-retracting assembly that allows the belt to be retracted into a housing when the belt is not in use.

8. The assembly as specified in claim 1 further comprising a backrest cushion attached to the front surface of said backrest by an attachment means.

9. The assembly as specified in claim 8 where said cushion attachment means comprises a female detent attached to each corner of said backrest, and a corresponding male detent attached to each back corner of said backrest cushion where when the two detents are pressed together said backrest cushion is secured to said backrest.

10. The assembly as specified in claim 1 further comprising a seat cushion attached to the upper surface of said seat by an attachment means.

11. The assembly as specified in claim 10 wherein said means for attaching said seat cushion to said seat platform comprises a set of hook and loop fasteners respectively attached to the corners of said seat cushion and said seat.

12. The assembly as specified in claim 1 further comprising a headrest that is attached to the upper frame member of said backrest by an attachment means.

13. The assembly as specified in claim 1 further comprising an articulated armrest assembly comprising:

a) a backrest further having a backrest swivel bore located on its first and second vertical members above the hinge pin bore, b) a seat further having a swivel bore substantially centered on its first and second side surface, c) an armrest having a front section and a back end, where near the back end is located a backrest pin bore that is aligned with the backrest swivel bore, where into these two bores is inserted and attached a first swivel pin that allows the armrest to pivot about the first swivel pin, said armrest further having an armrest swivel bore located near the front section of said armrest, and d) an armrest support having an upper end and a lower end, with the upper end having an armrest pin bore and the lower end having a seat pin bore, where when a second swivel pin is inserted and attached through the armrest pin bore and the armrest swivel bore, and a third swivel pin is inserted and attached through the seat pin bore and seat swivel bore, said armrest remains in a usable horizontal position and conversely, pivotally collapses against said seat when said backrest is lowered.

14. The assembly as specified in claim 1 further comprising an animal safely harness comprising:
   a) an adjustable harness that is attached around the neck of an animal, and
   b) a belt having one end that is attached to said harness by an attachment means and the other end is attached to a buckle insert that is lockably inserted into said seat-belt receptor that is swivelly attached to said first side plate.

15. The assembly as specified in claim 1 further comprising an animal safety harness comprising:
   a) an adjustable harness that is attached around the neck of an animal, and
   b) a belt having one end that is attached to said harness by an attachment means, and the other end is attached to a buckle receptor that lockably accepts the buckle insert attached to the seat belt attached to said second side plate.

16. A seat assembly that detachably attaches to a truck bed, said seat assembly comprising:
   a) a truck bed having a set of four bolt bores located therethrough on the truck bed and spaced in a rectangular pattern,
   b) a threaded nut attached to the bottom surface of the truck bed with its threaded section aligned over the bolt bore,
   c) a first and second side plate, with each plate having an upper edge, a lower edge, a front edge and a back edge, said side plate further having normal to its side:
      (1) three seat attachment bores therethrough, located near the lower edge,
      (2) a backrest hinge pin bore therethrough, located near the back edge,
      (3) a backrest locking bore therethrough, located near the corner of the upper edge and the back edge,
      (4) at least two seat-belt attachment bores therethrough, located near the upper edge of said second side plate, and
      (5) a seat-belt receptor bore therethrough located near the upper edge of said first side plate and centrally aligned between said at least two seat belt attachment bores,
   d) a seat having a lower surface, an upper surface, a first side surface and a second side surface,
   e) a set of four L-brackets where each bracket has a vertical section and a horizontal section having a substantially centered nut bore therethrough, where to the first side surface of said seat is attached the vertical section of two L-brackets by an attachment means and to the second side surface of said seat is likewise attached two L-brackets, where when so attached, the nut bores on the horizontal section are in alignment with the respective bolt bores on the truck bed,
   f) a threaded bolt sequentially inserted through the nut bore on the horizontal section of said L-brackets, the bolt bores on the truck bed and into the threaded nut on the bottom surface of the truck bed,
   g) a backrest comprising:
      (1) an upper frame member having a first end and a second end,
      (2) a first vertical member extending downward from the first end of the upper frame member and having near its bottom edge, normal to the first vertical member, a hinge pin bore therethrough and having above the hinge pin bore, also normal to the first vertical member, a locking bore therethrough,
      (3) a second vertical member extending downward from the second end of the upper frame member and having near its bottom edge, normal to the second vertical member, a hinge pin bore therethrough and having above the hinge pin bore, also normal to the second vertical member, a locking bore therethrough,
      (4) an upper back support attached between said first and second vertical members,
      (5) a lower back support attached between said first and second vertical members,
   h) a pivot pin inserted through each of the hinge pin bores on said backrest and through the backrest hinge pin bores on said side plates, where said pivot pins have means for being retained therein and allow, said backrest to be lowered against the upper surface of said seat,
   i) a locking pin inserted through each of the locking bores on said backrest and through the backrest locking bores on said first and second side plate, where when said locking pins are inserted, said backrest is secured in its upright, normal sitting position and when said locking pins are not inserted, said backrest may be pivoted downward, about said pivot pins, to allow said backrest to be lowered against the upper surface of said seat,
   j) a seat belt assembly comprising:
      (1) a seat belt buckle receptor that includes a bottom section having a bore therethrough that is in alignment with said seat-belt receptor bore on said first side plate, where through said bores is inserted and retained a receptor pin to swivelly attach said receptor to said first side plate, and
      (2) a seat belt having an attachment section on one end and a buckle-insert on the other end, with the attachment section attached to and near the upper edge of said second side plate, where when said buckle insert is lockably inserted into said seat-belt receptor, a person sitting on said assembly is safely buckled therein.

17. The assembly as specified in claim 16 further comprising a backrest cushion attached to the front surface of said backrest by an attachment means.

18. The assembly as specified in claim 16 further comprising a seat cushion attached to the upper surface of said seat by an attachment means.

19. The assembly as specified in claim 16 further comprising an articulated armrest assembly comprising:
   a) a backrest further having a backrest swivel bore located on its first and second vertical members above the hinge pin bore,
   b) a seat further having a seat swivel bore substantially centered on its first and second side surface,
   c) an armrest having a front section and a back end, where near the back end is located a backrest pin bore that is aligned with the backrest swivel bore, where into these two bores is inserted and attached a first swivel pin that allows the armrest to pivot about the first swivel pin, said armrest further having an armrest swivel bore located near the front section of said armrest, and
   d) an armrest support having an upper end and a lower end, with the upper end having an armrest pin bore and the lower end having a seat pin bore, where when a second swivel pin is inserted and attached through the armrest pin bore and armrest swivel bore and a third swivel pin is inserted and attached through the seat pin bore and seat swivel bore, said armrest remains in a usable horizontal position and conversely, pivotally collapses against said seat when said backrest is lowered.

20. A seat assembly that detachably attaches to a truck bed, said seat assembly comprising:

a) a first and second side plate, with each plate having an upper edge, a lower edge, a front edge and a back edge, said side plate further having normal to its side, a backrest hinge pin bore therethrough, located near the back edge, and a backrest locking bore therethrough, located near the corner of the upper edge and the back edge, b) a seat-belt receptor attached, by an attachment means near the upper edge of said first side plate, c) a seat having a lower surface, an upper surface, a first side surface and a second side surface, with the first and second side surfaces having means for being attached between the lower edges of said first and second side plates, d) means for attaching said seat to the truck bed, e) a backrest comprising:
   (1) an upper frame member having a first end and a second end,
   (2) a first vertical member extending downward from the first end of the upper frame member and having near its bottom edge, normal to the first vertical member, a hinge pin bore therethrough and having above the hinge pin bore, also normal to the first vertical member, a locking bore therethrough,
   (3) a second vertical member extending downward from the second end of the upper frame member and having near its bottom edge, normal to the second vertical member, a hinge pin bore therethrough and having above the hinge pin bore, also normal to the second vertical member, a locking bore therethrough, f) a pivot pin inserted through each of the hinge pin bores on said backrest and through the backrest hinge pin bores on said side plates, where said pivot pins have means for being retained therein and allow, said backrest to be lowered against the upper surface of said seat, g) a locking pin inserted through each of the locking bores on said backrest and through the backrest locking bores on said first and second side plate, where when said locking pins are inserted, said backrest is secured in its upright, normal sitting position and when said locking pins are not inserted, said backrest pivots downward about said pivot pin to allow said backrest to be lowered against the upper surface of said seat when said assembly is not being occupied, h) a seat belt assembly comprising:
   (1) a seat belt buckle receptor attached by an attachment means, to and near the upper edge of said first side plate, and
   (2) a seat belt having an attachment section on one end and a buckle-insert on the other end, with the attachment section attached, by an attachment means to and near the upper edge of said second side plate, where when said buckle insert is lockably inserted into said seat-belt receptor, a person sitting on said assembly is safely restrained thereto.

* * * * *